United States Patent [19]
James, Jr.

[11] 3,782,442
[45] Jan. 1, 1974

[54] ADJUSTABLE THRUST MECHANISM FOR SEPARATING THE BONDS BETWEEN ANNULAR COMPONENTS OF PNEUMATIC TIRE-WHEEL ASSEMBLIES

[76] Inventor: Jake James, Jr., Rt. No. 1, Danville, Ark. 72833

[22] Filed: Sept. 2, 1971

[21] Appl. No.: 177,394

[52] U.S. Cl. .............................................. 157/1.26
[51] Int. Cl. ............................................ B60c 25/06
[58] Field of Search................. 157/1.17, 1.26, 1.28, 157/1.33

[56] References Cited
UNITED STATES PATENTS

| | | | |
|---|---|---|---|
| 3,362,453 | 1/1968 | Nester | 157/1.17 |
| 3,033,268 | 5/1962 | Schaevitz | 157/1.26 |
| 2,832,400 | 4/1958 | Laughlin | 157/1.28 |
| 2,840,143 | 6/1958 | Skiles | 157/1.26 |
| 3,523,567 | 8/1970 | Voights | 157/1.17 |

Primary Examiner—Granville Y. Custer, Jr.
Attorney—Robert Brown, Jr.

[57] ABSTRACT

Apparatus for separating bonds between annular tire-wheel components such as wheel flanges, bead rims, locking rings and tire beads. In the separation of tire beads from wheel rims, for example, the free contact end of an elongated reciprocable thrust tool is swingably mounted about a fixed pivot, transversely of a bead-engaged flange, and to selected pressure-applying positions where it may be releasably fixed in position. The thrust tool may be employed singly in breaking only one bead of an assembly, or in combination with an opposing thrust tool when simultaneously breaking both tire beads. The mechanism is further characterized by a pair of manually operable levers engageable with opposed faces of the tire at points diametrically opposite the thrust tool to thereby stabilize the assembly during a bond breaking operation.

2 Claims, 10 Drawing Figures

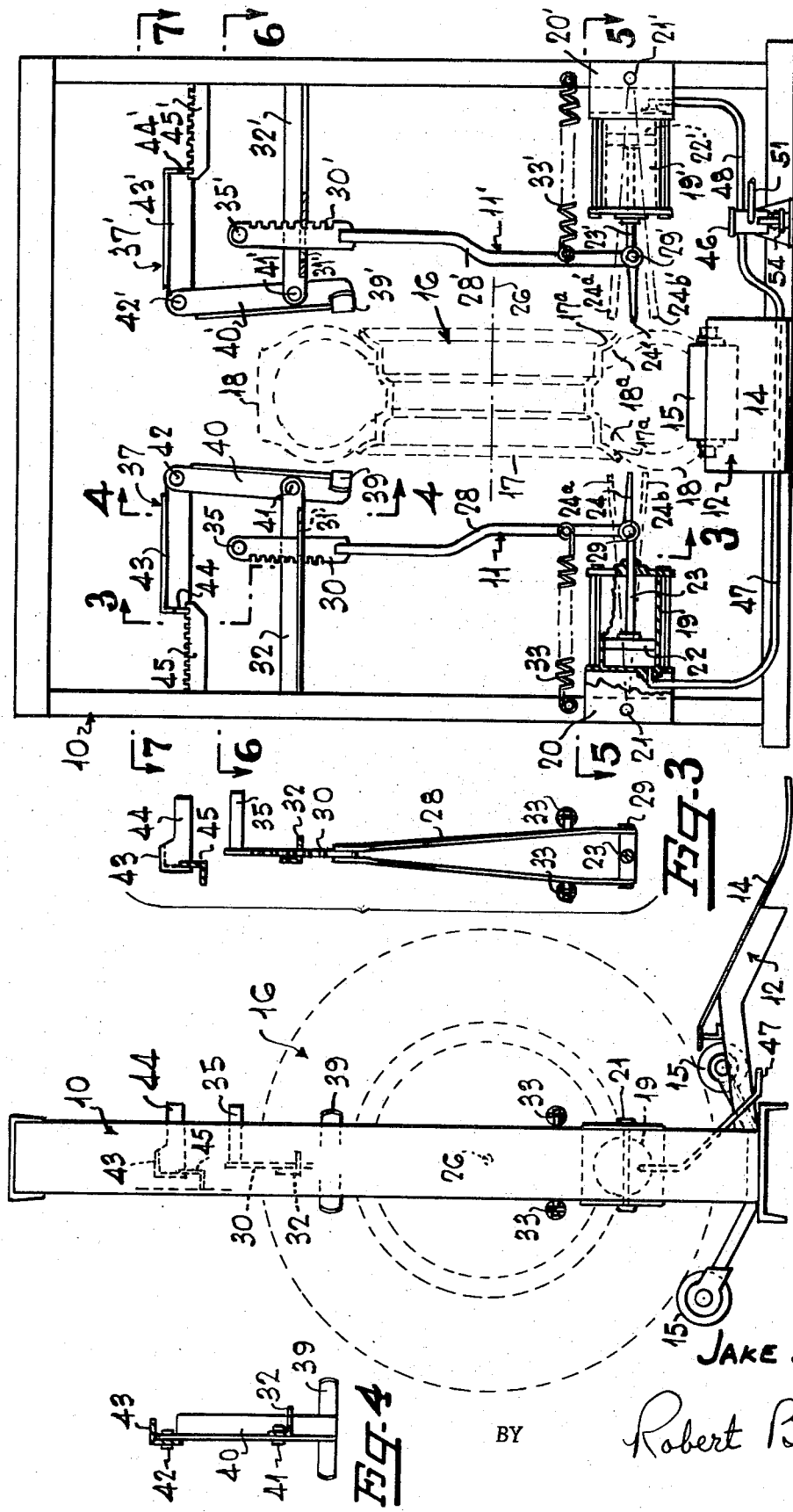

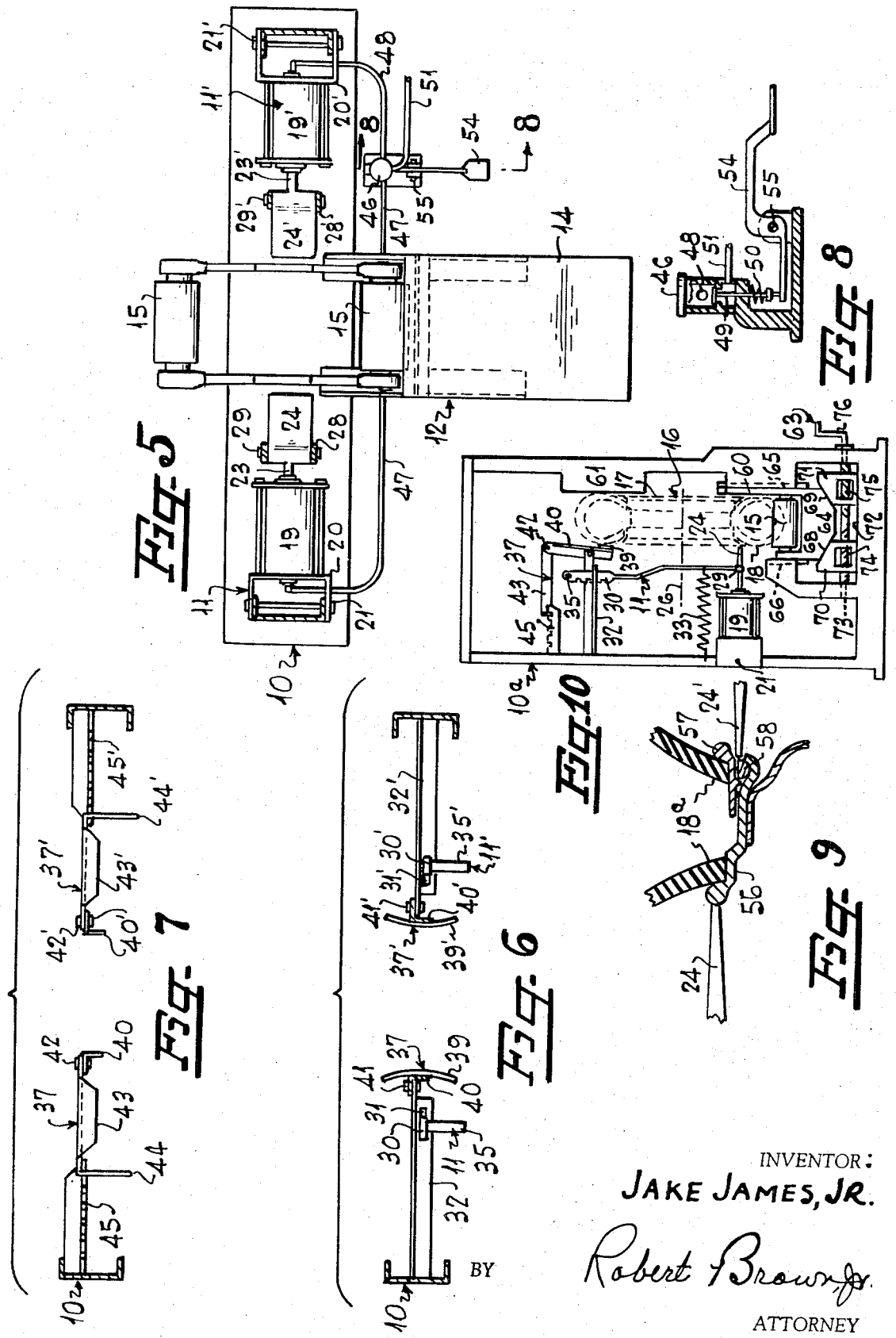

ADJUSTABLE THRUST MECHANISM FOR SEPARATING THE BONDS BETWEEN ANNULAR COMPONENTS OF PNEUMATIC TIRE-WHEEL ASSEMBLIES

This invention relates to machines for use in demounting pneumatic tires from wheel rims of wheel assemblies, and more particularly a machine of this class provided with a reciprocable power thrust tool adapted to be quickly adjusted to contact the face of the assembly at selected points along the wheel radius.

Heretofore, various types of machines have been employed with adjustments purporting to insure proper contact between the thrust tool or ram and the tire components. Schaevitz U.S. Pat. No. 3,033,268 is an example of such an adjustment by bodily raising or lowering the thrust element assembly relative to the wheel assembly, while Whited U.S. Pat. No. 3,426,827 raises and lowers the wheel assembly. Other tool position adjustments include bolt-slot connections such as shown in U.S. Pat. No. 2,798,540 which require tedious and time-consuming manipulations.

The above-mentioned types of prior art adjustment mechanisms have serious drawbacks either due to complex, costly and unsafe construction and inefficient operation, or combinations of two or more of these objections.

It is therefore an object of this invention to provide an adjustable power thrust, tire-wheel-component, bond-breaking mechanism which substantially reduces the aforementioned objections to similar prior art devices.

It is a further object of this invention to provide an adjustable power thrust tool or ram assembly for separating the bonds between annular components of pneumatic tire-wheel assemblies wherein one end of the ram assembly remains anchored to a fixed pivot and the opposite engaging end is swingable about a radius and through a relatively short arc to selected thrust positions transversely of the bonded annular junction. This construction permits adjustment of the tool contacting positions by slightly varying the angularity of the assembly at the pivot, but without changing the location of the pivot or thrust reaction point, thereby contributing to the simplicity, safety and stability of the entire mechanism.

It is another object of this invention to provide a mechanism of the class described which is portable, practically maintenance free, economical to manufacture, and self-contained.

Some of the objects of invention having been stated, other objects will appear as the description proceeds when taken in connection with the accompanying drawings in which, FIG. 1 is a front elevation of my machine, with parts shown in section, and further showing a pair of oppositely acting thrust assemblies for simultaneously engaging opposite faces of a tire-wheel assembly;

FIG. 2 is an elevation of the left-hand side of FIG. 1;

FIG. 3 is a sectional view taken along line 3—3 in FIG. 1;

FIG. 4 is a sectional view taken along line 4—4 in FIG. 1;

FIG. 5 is a sectional plan view taken along line 5—5 in FIG. 1;

FIG. 6 is a sectional plan view taken along line 6—6 in FIG. 1;

FIG. 7 is a sectional plan view taken along line 7—7 in FIG. 1;

FIG. 8 is a sectional view taken along line 8—8 in FIG. 5, showing details of the foot-actuated control valve;

FIG. 9 is a sectional detail view showing the present invention as used to separate bonds between 3-piece rim components, and FIG. 10 is a schematic view showing a single power thrust assembly adapted for operation on one side of a tire-wheel assembly only.

Referring more particularly to the drawings, the numeral 10 denotes a rectangular framework for supporting two opposite-hand and oppositely-acting power thrust assemblies broadly designated by numerals 11 and 11', respectively. These assemblies are substantially identical in construction and, therefore, a detailed description of only one will be made; and the other assembly will be referred to with the same numerals with prime notations added to designate corresponding parts.

A ramp assembly, broadly designated by numeral 12, is mounted on the vertical center line of the base of framework 10, said assembly comprising an inclined ramp 14 and a pair of spaced parallel rollers 15. Ramp 14 facilitates rolling of a tire-wheel assembly 16 to the dotted-line operating position upon the rollers 15 and between opposed thrust assemblies 11 and 11' as shown in FIGS. 1 and 5.

For purposes of illustration, a two-piece tire wheel is shown, but the invention is adapted to operate in conjunction with other types as illustrated in FIG. 9.

The thrust assembly 11 comprises a pneumatic or similar type of cylinder 19 secured to U-shaped bracket 20 pivotally secured as at 21 to framework 10. Cylinder 19 is equipped with piston 22 and attached piston rod 23, the outer end of said rod having a thrust tool or wedge 24 integral therewith. The proximate outer end portions of these tools are swingable substantially in a plane passing through the center 26 of tire-wheel assembly 16 and the pivots 21 and 21' about which the respective tools are anchored. Thus, the proximate ends of thrust tools 24 and 24' swing radially of the tire wheel assembly 16 and transversely of tire beads 18a and the rim flanges 17a.

In the positions shown in FIG. 1, the tools are longitudinally alined and ready to engage the two tire beads 18a at the same elevations to simultaneously separate the beads from the flanges 17a. A tire-wheel assembly 16 of a different diameter, however, will have a bead-flange bond at a higher or lower elevation thereby requiring adjustment of the contact ends of the thrust tools 24 and 24' accordingly, such as for example, to dotted line positions 24a or 24b (FIG. 1).

In order to provide adjustment for an assembly 16 of a different size, the lower end of a vertically extending link 28 is pivotally secured as at 29 to tool 24, the upper end of said link having a toothed rack 30 releasably engageable with one end or tool of a horizontal slot 31 provided in the outstanding leg of structural member 32 cantilevered from framework 10 (FIG. 6). Tension springs 33 connect the intermediate portion of link 28 to the framework 10 and serve the dual function of biasing tool 24 toward retracted position and yieldingly holding rack 30 in engagement with the end of slot 31. Rack 30 is provided with a shifting handle 35 for use by the operator when making an adjustment.

If tool 24 should break its associated bead 18a from rim flange 17a before the opposing tool 24' makes a break, the tools are retracted to permit tool 24 to be repositioned against its associated rim flange 17a while tool 24' remains at the same elevation. Then the tools are again actuated to separate the remaining bond.

It is important to note that the tooth-rack construction 30, 31 affords almost instantaneous manual adjustment of the position of one and/or both of the oppositely disposed thrust wedges or tools 24, 24'. More particularly, the tools may be independently released from one fixed position, shifted while in released position to a selected position, and then releasably fixed in the selected position. By employing this improved shift-type mechanism, a very substantial reduction in time can be realized in a single bead-breaking operation for a tire-wheel assembly, as compared with the time required for the same operation when using the screw-type adjustment means such as indicated by the reference numerals 32, 33 in the above-mentioned Schaevitz U.S. Pat. No. 3,033,268. The increased efficiency of the shift-type adjustment will be appreciated more fully in view of the further explanation in the next paragraph.

Experience teaches that in nearly all cases of bead-flange separation by means of oppositely disposed thrust tools, one bead will break loose before the other. To break the other bead in such cases, the thrust tools 24, 24' must be retracted to permit the tool at the broken bead to be raised to a position opposite the rim flange, and then the opposed thrust tools as adjusted must be moved inwardly against the last-named flange and the unbroken tire bead respectively, thereby completing the separation of both beads for a segment of the wheel. To separate the beads at the remaining segments, the wheel assembly 16 is rotated to position unbroken bead segments between the tools; and after any necessary adjustments of these tools, the above bead breaking steps are repeated. Since several adjustments are usually made during a complete bead breaking operation for a wheel assembly 16, the total time saved is quite substantial. For repeated operations over a long period, the saving of time is even more impressive.

In order to hold the tire-wheel assembly 16 in proper upright position (FIG. 1), suitable adjustable and oppositely acting clamp or holding assemblies 37 and 37' are provided, said assemblies adapted to engage and clamp opposed faces of the tire 18 at points diametrically above the thrust rams or tools and the tire-wheel assembly axis 26 (FIG. 2).

The assembly 37 includes a horizontally disposed tire-engaging bar 39 integral with the lower end of a vertically disposed lever 40 pivoted intermediate its ends as at 41 to the end of cantilevered member 32. The upper end of lever 40 is pivoted as at 42 to one leg of L-shaped shifting member 43, the leg 44 thereof releasably engageable with the teeth of a rack 45. Leg 44 also serves as an operating handle. Corresponding parts of the opposite holding assembly 37' bear like reference numerals with prime notations added.

Cylinders 19 and 19' are connected to foot valve unit 46 by means of conduits 47 and 48, said unit having a suitable valve element 49 therein normally biased toward closing position by a spring 50 (FIG. 8). An air supply conduit 51 communicates with the interior of unit 41 on the side of valve element 49 opposite the ports of conduits 47 and 48, said valve element 49 being operable by means of foot lever 54 pivoted intermediate its ends as at 55.

FIG. 9 shows a 3-piece rim assembly consisting of a fixed rim part 56, a removable rim part 57, and a removable split look ring part 58. By suitably positioning the tools or wedges 24 and 24' in engagement with opposed fixed and removable parts 56 and 58, for example, and then applying pressure axially of the wheel assembly, separation of the interfacial bonds can be effected.

FIG. 10 shows a modified adaptation of the present invention similar to FIGS. 1-8 wherein laterally fixed means 60 and 61 are provided to resist the axial thrust of assembly 11 instead of the laterally movable assembly 11', the latter assembly serving as a thrust resisting means in the preceding embodiment. FIG. 10 further shows means 63 for vertically adjusting the position of tire-wheel assembly 16 relative to the pivoted thrust wedge 24, said means including block 64 for supporting rollers 15. Block 64 is mounted for vertical movement between guideways 65 and 66 on framework 10a. The lower surface of block 64 has convergent surfaces 68 and 69 which slidably engage similarly convergent surfaces on the upper faces of blocks 70 and 71 respectively. It will be noted that the lower surfaces of blocks 70 and 71 are slidably mounted upon horizontal surface 72 of framework 10a. A rod 73 has reversely threaded portions 74 and 74 interengaging cam blocks 70 and 71 respectively, said rod having operating crank 76 on one end thereof.

Each of the opposing clamp assemblies 37 and 37' is provided with a tooth-rack adjustment means 44, 45 or 44' or 45' which affords quick manual adjustment of the relative positions of the tire-engaging clamp bars 39 and 39'. In other words, the clamp bars may be independently and quickly released from one fixed position, shifted while released to a selected position, and then releasably secured in the selected position.

The operation of the adjustment means for assemblies 37 and 37' is similar in principle to that for adjusting the positions of thrust tools 30, 31. In other words, the shift-type adjustment means 44, 44' and 45, 45' may be released from one fixed position, shifted while released to a selected position, and then releasably secured in the selected position.

Thus, when the time saved by the shift-type adjusting means 30, 31, 30', 31', is added to the time saved by the second shift-type adjusting means 44,45,44',45', the total time saved in processing one tire-rim assembly 16 amounts to a substantial operating economy. The first and second shift-type adjusting means are operated alternately while separating the beads from the rim flanges, and therefore the sum total of the savings of both are pertinent.

By turning crank 76, the lateral positions of cam blocks 70 and 71 will be varied thereby varying the elevation of block 64, rollers 15 and tire assembly 16 relative to thrust wedge 24. This vertical adjustment means cooperates with adjustment mechanism 11 to increase the number of angular positions possible between the thrust tool 24 and the convex outer surface of the tire 18. The adjustment means 63 further enables the operator to quickly accommodate wheel assemblies of different sizes to positions corresponding to optimum operating positions of the pivoted thrust wedges 24.

To operate, the wheel assembly 16 is rolled upon ramp 14 and on rollers 15. Then the holding arm assemblies 37 and 37' are adjusted against opposite faces of tire 18 to hold it in place on the rollers during the following working operation. Next, the pressure tools 24 and 24' are adjusted about pivots 21 and 21' to the proper elevation to engage the tire beads 18a at points adjacent the flanges 17a, this adjustment being effected by means of handles 35, 35'. The bead or bond is now ready to be broken, at which time the operator depresses pedal 54 to introduce air pressure into cylinders 19 and 19'. When the pedal is depressed, air flows into the cylinders to operate the thrust tools; and when the pedal is released, the air is released from the cylinders by conventional means (not shown) to permit springs 33 to retract the tools to the positions shown in FIGS. 1 and 10.

I claim:

1. Apparatus for breaking bonds between annular components of a pneumatic tire-wheel assembly (16), said assembly including tire bead-engaged flanges (17a, 17a) on opposite faces thereof, comprising the combination of:
   a. a pair of oppositely disposed reciprocable bead-breaking thrust tools (24, 24');
   b. means (15, 15) for supporting the bead-engaged flanges of said assembly between said tools;
   c. means (21, 21') for pivotally mounting each of said tools for movement transversely of its proximate bead-engaged flange and through an arc lying in a plane normal to said assembly faces, and
   d. means including a tooth and rack connection (30, 31, 30', 31') for selectively and releasably securing each of said tools in a plurality of fixed positions along said arc.

2. Apparatus as defined in claim 1 and further comprising: a pair of pivoted levers (40, 40') having the free ends (39, 39') thereof swingable toward and away from the opposite faces of said assembly (16) at points disposed substantially diametrically opposite said supporting means (15, 15), and means including a second tooth and rack connection (44, 44', 45, 45') for selectively and releasably securing each of said lever engaging ends in a plurality of fixed positions, whereby assemblies of various widths may be clamped between said lever ends.

* * * * *